United States Patent
Hyde et al.

(10) Patent No.: US 9,567,983 B2
(45) Date of Patent: Feb. 14, 2017

(54) METHOD FOR GENERATION OF POWER FROM INTRALUMINAL PRESSURE CHANGES

(75) Inventors: Roderick A. Hyde, Redmond, WA (US); Muriel Y. Ishikawa, Livermore, CA (US); Eric C. Leuthardt, St. Louis, MO (US); Michael A. Smith, Phoenix, AZ (US); Lowell L. Wood, Jr., Bellevue, WA (US); Victoria Y.H. Wood, Livermore, CA (US)

(73) Assignee: DEEP SCIENCE, LLC, Bellevue, WA (US)

( * ) Notice: Subject to any disclaimer, the term of this patent is extended or adjusted under 35 U.S.C. 154(b) by 1646 days.

(21) Appl. No.: 12/315,631

(22) Filed: Dec. 4, 2008

(65) Prior Publication Data

US 2010/0140957 A1    Jun. 10, 2010

(51) Int. Cl.

| F02B 63/04 | (2006.01) |
|---|---|
| F03G 7/08 | (2006.01) |
| H02K 7/18 | (2006.01) |
| F03G 7/04 | (2006.01) |
| B60L 11/02 | (2006.01) |
| B61C 9/38 | (2006.01) |

(52) U.S. Cl.
CPC ........................... *F03G 7/04* (2013.01)

(58) Field of Classification Search
USPC .................. 290/1 R, 10; 607/35; 600/16
See application file for complete search history.

(56) References Cited

U.S. PATENT DOCUMENTS

| 3,358,690 A | 12/1967 | Cohen ............................ 607/23 |
| 3,421,512 A | 1/1969 | Frasier .......................... 607/35 |
| 3,456,134 A | 7/1969 | Ko ................................ 607/35 |
| 3,522,811 A | 8/1970 | Schwartz et al. .............. 607/27 |
| 3,563,245 A | 2/1971 | McLean et al. ............... 607/35 |
| 3,649,615 A | 3/1972 | Ikeda et al. ................... 534/642 |
| 3,659,615 A | 5/1972 | Enger ............................ 607/35 |
| 3,861,397 A | 1/1975 | Rao et al. ...................... 607/35 |
| 3,906,960 A | 9/1975 | Lehr .............................. 607/35 |
| 3,943,936 A | 3/1976 | Rasor et al. ................... 607/35 |
| 4,140,132 A * | 2/1979 | Dahl .............................. 607/19 |
| 4,294,891 A | 10/1981 | Yao et al. ...................... 429/2 |
| 4,453,537 A | 6/1984 | Spitzer ......................... 623/3.12 |
| 4,661,107 A | 4/1987 | Fink ............................. 623/2.34 |

(Continued)

FOREIGN PATENT DOCUMENTS

| GB | 1220677 | 1/1971 |
| GB | 2350302 | 11/2000 |

OTHER PUBLICATIONS

Franklin Hadley, Goodbye Wires . . . , MIT News, Jun. 7, 2007, Publisher: http://web.mit.edu/newsoffice/2007/wireless-0607.html, Published in: US.

(Continued)

*Primary Examiner* — Pedro J Cuevas
(74) *Attorney, Agent, or Firm* — Faisal K. Abou-Nasr; Advent, LLP

(57) ABSTRACT

A method for generating power from intraluminal pressure changes may comprise one or more of the following steps: (a) receiving an intraluminal pressure change; and (b) converting the intraluminal pressure change into energy with an intraluminal generator.

3 Claims, 13 Drawing Sheets

(56) References Cited

U.S. PATENT DOCUMENTS

| | | | |
|---|---|---|---|
| 4,690,143 A | 9/1987 | Schroeppel | 607/5 |
| 4,798,206 A | 1/1989 | Maddison et al. | 607/122 |
| 5,007,927 A | 4/1991 | Badylak et al. | 623/3.12 |
| 5,010,893 A | 4/1991 | Sholder | 600/595 |
| 5,154,680 A | 10/1992 | Drzewiecki et al. | 600/485 |
| 5,205,286 A | 4/1993 | Soukup et al. | 600/377 |
| 5,344,385 A | 9/1994 | Buck et al. | 600/16 |
| 5,348,019 A | 9/1994 | Sluss, Jr. et al. | 600/480 |
| 5,363,855 A | 11/1994 | Drzewiecki et al. | 600/485 |
| 5,411,537 A | 5/1995 | Munshi et al. | 607/33 |
| 5,431,694 A | 7/1995 | Snaper et al. | 607/35 |
| 5,443,504 A | 8/1995 | Hill | 623/3.12 |
| 5,457,624 A | 10/1995 | Hastings | 623/3.12 |
| 5,535,752 A | 7/1996 | Halperin et al. | 600/483 |
| 5,617,876 A | 4/1997 | van Duyl | 600/595 |
| 5,626,141 A | 5/1997 | Takeda | 600/490 |
| 5,653,676 A | 8/1997 | Buck et al. | 600/16 |
| 5,690,693 A | 11/1997 | Wang et al. | 607/61 |
| 5,693,952 A | 12/1997 | Cox | 250/551 |
| 5,701,919 A | 12/1997 | Buck et al. | 128/898 |
| 5,702,431 A | 12/1997 | Wang et al. | 607/61 |
| 5,713,939 A | 2/1998 | Nedungadi et al. | 607/33 |
| 5,715,837 A | 2/1998 | Chen | 128/899 |
| 5,734,564 A | 3/1998 | Brkovic | 363/21.16 |
| 5,745,358 A | 4/1998 | Faulk | 363/95 |
| 5,749,909 A | 5/1998 | Schroeppel et al. | 607/33 |
| 5,764,495 A | 6/1998 | Faulk | 363/21.13 |
| 5,810,015 A | 9/1998 | Flaherty | 128/897 |
| 5,823,199 A | 10/1998 | Hastings et al. | 128/899 |
| 5,954,058 A | 9/1999 | Flaherty | 128/899 |
| 5,984,857 A | 11/1999 | Buck et al. | 600/16 |
| 6,164,284 A | 12/2000 | Schulman et al. | 128/899 |
| 6,268,161 B1 | 7/2001 | Han et al. | 435/14 |
| 6,291,900 B1 | 9/2001 | Tiemann et al. | 290/1 A |
| 6,409,674 B1 | 6/2002 | Brockway et al. | 600/486 |
| 6,432,050 B1 | 8/2002 | Porat et al. | 600/300 |
| 6,475,750 B1 | 11/2002 | Han et al. | 435/14 |
| 6,524,256 B2 | 2/2003 | Schaldach et al. | 600/486 |
| 6,564,807 B1 | 5/2003 | Schulman et al. | 128/899 |
| 6,580,177 B1 | 6/2003 | Hagood, IV et al. | 290/1 R |
| 6,589,184 B2 | 7/2003 | Norén et al. | 600/486 |
| 6,638,231 B2 | 10/2003 | Govari et al. | 600/486 |
| 6,682,490 B2 | 1/2004 | Roy et al. | 600/486 |
| 6,711,423 B2 | 3/2004 | Colvin, Jr. | 600/317 |
| 6,822,343 B2 | 11/2004 | Estevez | 290/1 R |
| 6,827,682 B2 | 12/2004 | Bugge et al. | 600/16 |
| 6,829,507 B1 | 12/2004 | Lidman et al. | 607/19 |
| 6,860,857 B2 | 3/2005 | Norén et al. | 600/486 |
| 6,895,265 B2 | 5/2005 | Silver | 600/345 |
| 6,953,469 B2 | 10/2005 | Ryan | 606/192 |
| 7,032,600 B2 | 4/2006 | Fukuda et al. | 128/899 |
| 7,033,322 B2 | 4/2006 | Silver | 600/486 |
| 7,081,683 B2 | 7/2006 | Ariav | 290/1 R |
| 7,081,699 B2 | 7/2006 | Keolian et al. | 310/311 |
| 7,241,266 B2 * | 7/2007 | Zhou et al. | 600/365 |
| 7,263,894 B2 | 9/2007 | Tenerz | 73/756 |
| 7,302,856 B2 | 12/2007 | Tang et al. | 73/777 |
| 7,362,557 B2 | 4/2008 | Soudier et al. | 361/93.8 |
| 7,413,547 B1 | 8/2008 | Lichtscheidl et al. | 600/486 |
| 7,424,325 B2 | 9/2008 | Koller et al. | 607/35 |
| 7,427,265 B1 | 9/2008 | Keilman et al. | 600/300 |
| 7,452,334 B2 | 11/2008 | Gianchandani et al. | 600/485 |
| 7,616,990 B2 | 11/2009 | Chavan et al. | 607/2 |
| 7,616,992 B2 | 11/2009 | Dennis et al. | 607/9 |
| 7,715,918 B2 | 5/2010 | Melvin | 607/35 |
| 7,729,767 B2 | 6/2010 | Baker, III et al. | 607/35 |
| 7,729,768 B2 | 6/2010 | White et al. | 607/35 |
| 7,777,623 B2 | 8/2010 | Albsmeier et al. | 340/539.26 |
| 7,798,973 B2 | 9/2010 | Stahmann | 600/485 |
| 7,859,171 B2 | 12/2010 | Micallef | 310/339 |
| 2002/0028999 A1 | 3/2002 | Schaldach et al. | 600/486 |
| 2003/0158584 A1 | 8/2003 | Cates et al. | 607/2 |
| 2004/0021322 A1 | 2/2004 | Ariav | 290/1 R |
| 2004/0039242 A1 | 2/2004 | Tolkoff et al. | 600/9 |
| 2004/0078027 A1 | 4/2004 | Shachar | 604/891.1 |
| 2004/0158294 A1 | 8/2004 | Thompson | 607/17 |
| 2004/0173220 A1* | 9/2004 | Harry et al. | 128/892 |
| 2004/0193058 A1 | 9/2004 | Montegrande et al. | 600/488 |
| 2004/0204744 A1 | 10/2004 | Penner et al. | 607/23 |
| 2004/0215279 A1 | 10/2004 | Houben et al. | 607/35 |
| 2005/0055061 A1 | 3/2005 | Holzer | 607/35 |
| 2005/0080346 A1 | 4/2005 | Gianchandani et al. | 600/486 |
| 2005/0256549 A1 | 11/2005 | Holzer | 607/35 |
| 2005/0261563 A1* | 11/2005 | Zhou et al. | 600/347 |
| 2006/0044078 A1 | 3/2006 | Ayazi et al. | 333/186 |
| 2006/0152309 A1 | 7/2006 | Mintchev et al. | 335/58 |
| 2006/0184206 A1 | 8/2006 | Baker, III et al. | 607/35 |
| 2006/0217776 A1 | 9/2006 | White et al. | 607/35 |
| 2006/0224214 A1 | 10/2006 | Koller et al. | 607/62 |
| 2007/0074731 A1 | 4/2007 | Potter | 128/899 |
| 2007/0088402 A1 | 4/2007 | Melvin | 607/35 |
| 2007/0093875 A1 | 4/2007 | Chavan et al. | 607/46 |
| 2007/0142728 A1 | 6/2007 | Penner et al. | 600/486 |
| 2007/0149885 A1 | 6/2007 | Corl et al. | 600/505 |
| 2007/0167988 A1 | 7/2007 | Cernasov | 607/35 |
| 2007/0221233 A1 | 9/2007 | Kawano et al. | 128/899 |
| 2007/0293904 A1 | 12/2007 | Gelbart et al. | 607/35 |
| 2008/0009687 A1 | 1/2008 | Smith et al. | 600/302 |
| 2008/0021333 A1 | 1/2008 | Huelskamp | 600/486 |
| 2008/0082005 A1 | 4/2008 | Stern et al. | 600/486 |
| 2008/0132967 A1 | 6/2008 | Von Arx et al. | 607/18 |
| 2008/0172043 A1 | 7/2008 | Sheppard et al. | 604/891.1 |
| 2008/0212262 A1 | 9/2008 | Micallef | 361/502 |
| 2008/0262562 A1 | 10/2008 | Roberts et al. | 607/35 |
| 2008/0281298 A1 | 11/2008 | Andersen et al. | 604/891.1 |
| 2009/0171413 A1 | 7/2009 | Zenati et al. | 607/32 |
| 2009/0171448 A1 | 7/2009 | Eli | 326/1.32 |
| 2009/0270742 A1 | 10/2009 | Wolinsky et al. | 600/486 |
| 2009/0281399 A1 | 11/2009 | Keel et al. | 600/301 |
| 2009/0292335 A1 | 11/2009 | Leonov | 607/35 |
| 2010/0010600 A1 | 1/2010 | Eriksson et al. | 607/116 |
| 2010/0030043 A1 | 2/2010 | Kuhn | 600/339 |
| 2010/0036450 A1 | 2/2010 | Axelrod et al. | 607/35 |
| 2010/0049275 A1 | 2/2010 | Chavan et al. | 607/44 |
| 2010/0076517 A1 | 3/2010 | Imran | 607/35 |
| 2010/0140943 A1 | 6/2010 | Hyde et al. | 290/50 |
| 2010/0140956 A1 | 6/2010 | Hyde et al. | 290/1 R |
| 2010/0140957 A1 | 6/2010 | Hyde et al. | 290/1 R |
| 2010/0140958 A1 | 6/2010 | Hyde et al. | 290/1 R |
| 2010/0140959 A1 | 6/2010 | Hyde et al. | 290/1 R |
| 2010/0141052 A1 | 6/2010 | Hyde et al. | 307/151 |
| 2010/0228312 A1 | 9/2010 | White et al. | 607/35 |
| 2010/0298720 A1 | 11/2010 | Potkay | 600/485 |
| 2011/0062713 A1* | 3/2011 | Ardoise et al. | 290/53 |
| 2011/0094314 A1 | 4/2011 | Dekker et al. | 73/862.045 |
| 2011/0275947 A1 | 11/2011 | Feldman et al. | 600/508 |

OTHER PUBLICATIONS

Zhong Lin Wang, Self-Powered Nanotech: Nanosize Machines Need Still Tinier Power Plants, Scientific American Magazine, Dec. 16, 2007, pp. 82-87, Published in: US.

Kara Gavin, Zapping the Heart Back Into Rhythm, University of Michigan Health Minute, Jun. 2, 2005, Published in: Ann Arbor, MI.

* cited by examiner

METHOD FOR GENERATION OF POWER FROM INTRALUMINAL PRESSURE CHANGES

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of the United States Patent Application having United States Postal Service Express Mail No. EM 260722709, titled Method for Generation of Power from Intraluminal Pressure Changes, naming Roderick A. Hyde, Muriel Y. Ishikawa, Eric C. Leuthardt, Michael A. Smith, Lowell L. Wood, Jr. and Victoria Y. H. Wood as inventors, filed Dec. 4, 2008, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

BACKGROUND

Small scale generators for generating energy at levels suitable for powering devices which are in vivo or ex vivo to a human or animal are described. Such generators may be implanted in luminal structures so as to extract power from intraluminal pressure changes.

DETAILED DESCRIPTION

Figure 1:
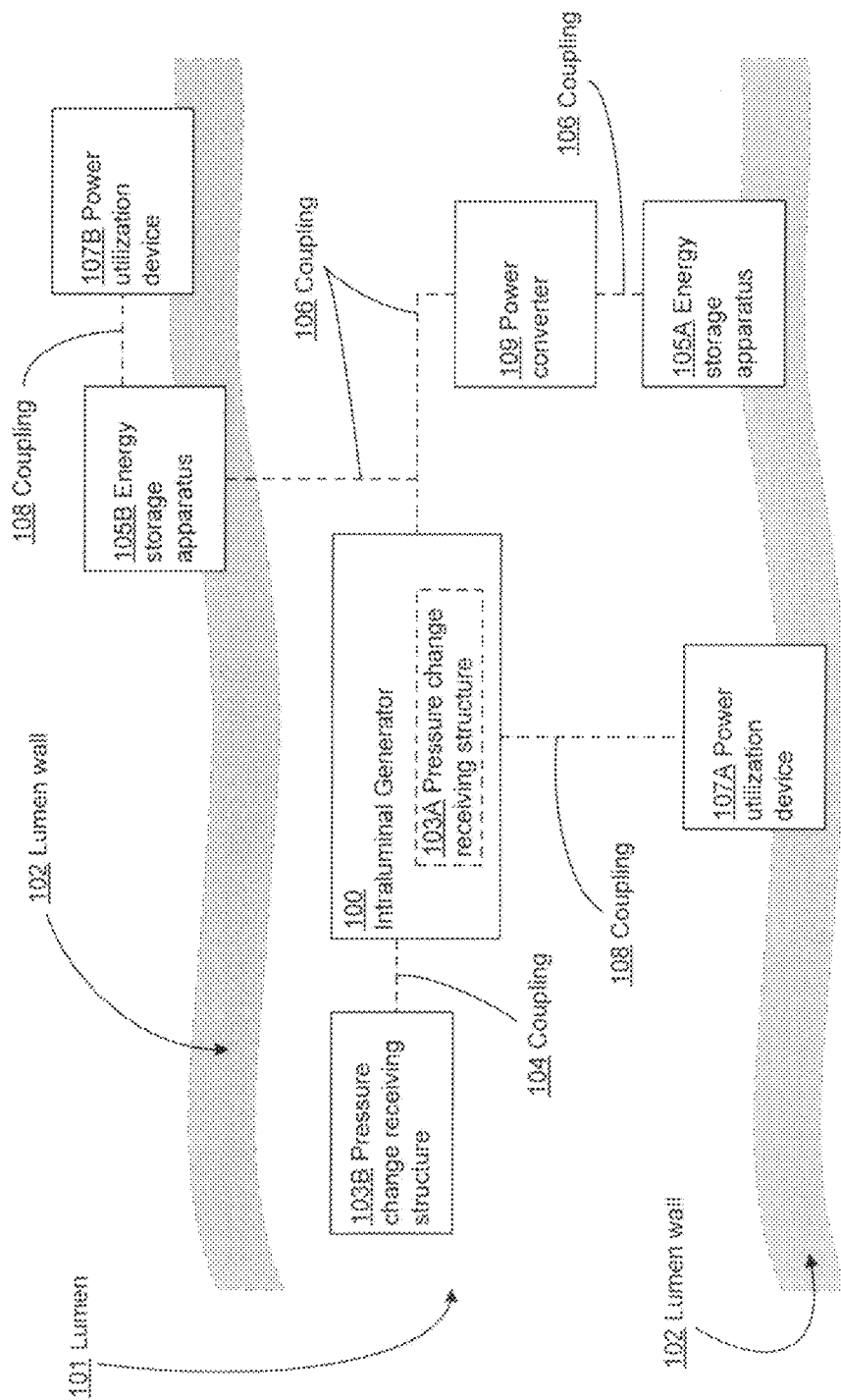
FIG. 1 shows a high-level block diagram of an intraluminal power generation system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 2:
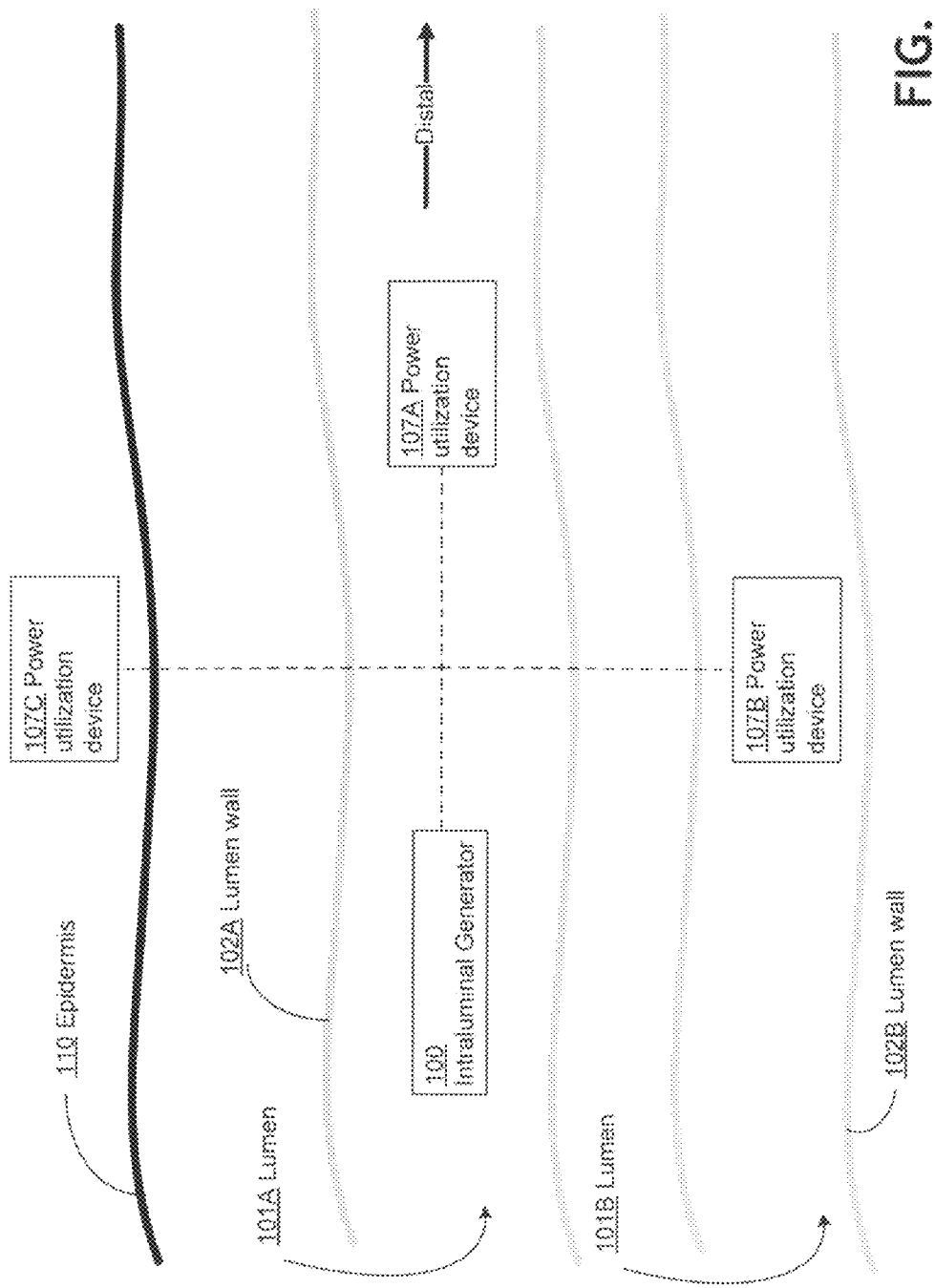
FIG. 2 shows a high-level block diagram of an intraluminal power generation system.

FIGS. 1 and 2 illustrate example environments in which one or more technologies may be implemented. An intraluminal power generation system may comprise an intraluminal generator 100 configured for disposal within an anatomical lumen 101 defined by a lumen wall 102. The intraluminal generator 100 may be configured to convert a varying intraluminal pressure change into energy (e.g. electrical energy, mechanical/elastic energy, chemical energy, thermal energy).

The intraluminal generator 100 may include an integrated pressure change receiving structure 103A configured to receive a pressure change associated with a fluid pressure within the lumen 101. Alternately, a pressure change receiving structure 103B may be operably coupled to the intraluminal generator 100 via a coupling 104 to transfer a received pressure from the pressure change receiving structure 103B to the intraluminal generator 100 in a form which the intraluminal generator 100 may convert to energy.

The intraluminal power generation system may comprise an energy storage apparatus 105 for storage of energy generated by the intraluminal generator 100. The energy storage apparatus 105 may be operably coupled to the intraluminal generator 100 by a coupling 106.

The intraluminal power generation system may comprise a power utilization device 107 which may use energy generated by the intraluminal generator 100 or stored in the energy storage apparatus 105 to carry out a desired function. The power utilization device 107 may be operably coupled to the intraluminal generator 100 or an energy storage apparatus 105 by a coupling 108.

FIG. 2 illustrates various spatial configurations of one or more components of an intraluminal power generation system. An intraluminal generator 100 disposed within in a first lumen 101A may be operably coupled to power utilization device 107A disposed in the first lumen 101A (e.g. in a distal relationship to the power utilization device 107A). An intraluminal generator 100 disposed within in a first lumen 101A may be operably coupled to power utilization device 107B disposed in a second lumen 101B. An intraluminal generator 100 disposed within in a first lumen 101A may be operably coupled to an ex vivo power utilization device 107C disposed outside the lumen or outside an epidermis layer 110.

Figure 3:
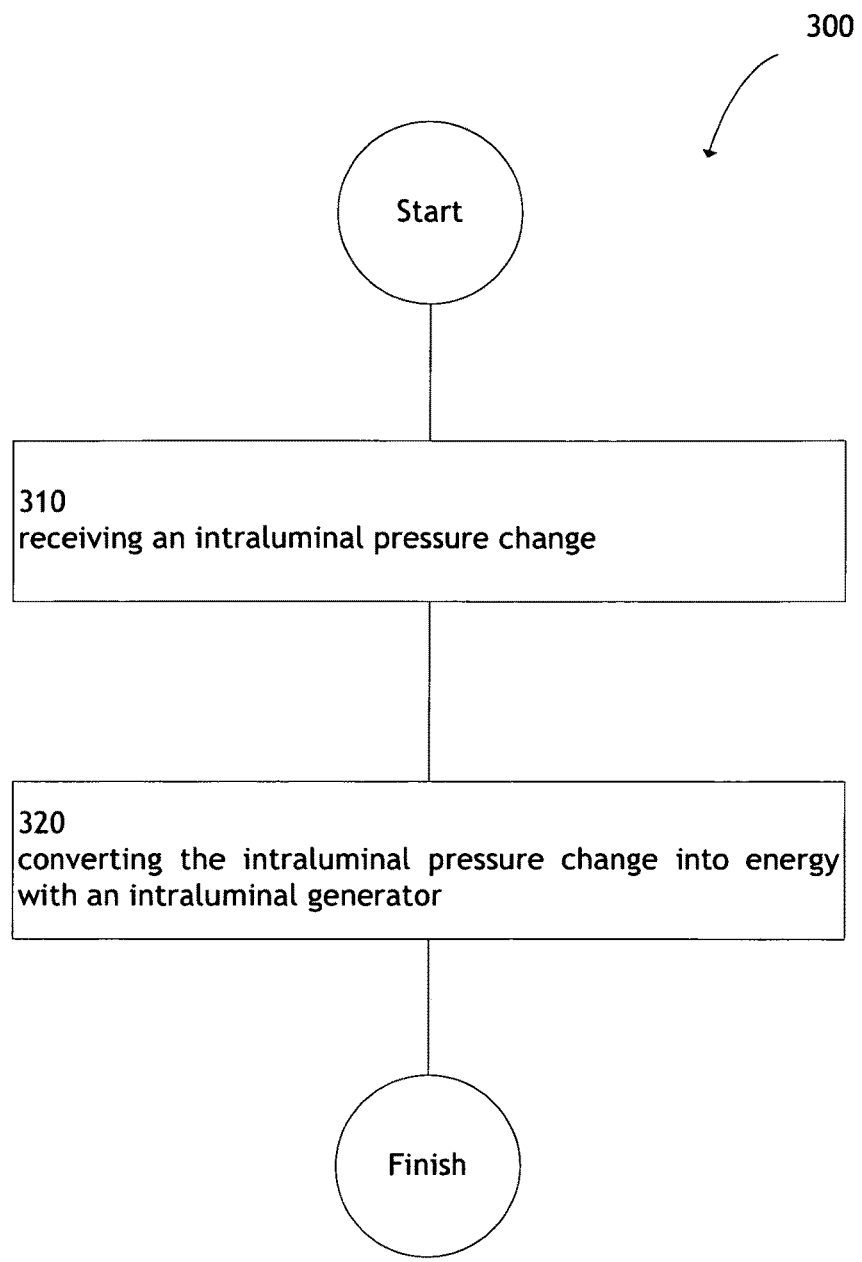
FIG. 3 is a high-level logic flowchart of a process.

FIG. 3 illustrates an operational flow 300 representing example operations related to generating power from intraluminal pressure changes. In FIG. 3 and in following figures that include various examples of operational flows, discussion and explanation may be provided with respect to the above-described examples of FIGS. 1 and 2, and/or with respect to other examples and contexts. However, it should be understood that the operational flows may be executed in a number of other environments and contexts, and/or in modified versions of FIGS. 1 and 2. Also, although the various operational flows are presented in the sequence(s) illustrated, it should be understood that the various operations may be performed in other orders than those which are illustrated, or may be performed concurrently.

After a start operation, the operational flow 300 moves to an operation 310. Operation 310 depicts receiving an intraluminal pressure change. For example, as shown in FIG. 1, a change in pressure within the lumen 101 may be received by a pressure change receiving structure 103. The pressure change receiving structure 103 may receive a change in pressure through exposure of a surface of the pressure change receiving structure 103 to the luminal environment such that a change in the intraluminal pressure may exert a force on the pressure change receiving structure 103 thereby resulting in a deformation of the pressure change receiving structure 103.

Operation 320 depicts converting the intraluminal pressure change into energy with an intraluminal generator. For example, as shown in FIG. 1, the change in pressure may induce a movement and/or deformation of the pressure change receiving structure 103 which may be translated either directly (e.g. the intraluminal generator 100 comprises the pressure change receiving structure 103A) or indirectly (e.g. the pressure change receiving structure 103B is operably coupled to a generator) into energy either through the motion of the pressure change receiving structure 103 and/or the electrical properties of the materials comprising the pressure change receiving structure 103.

Figure 4:
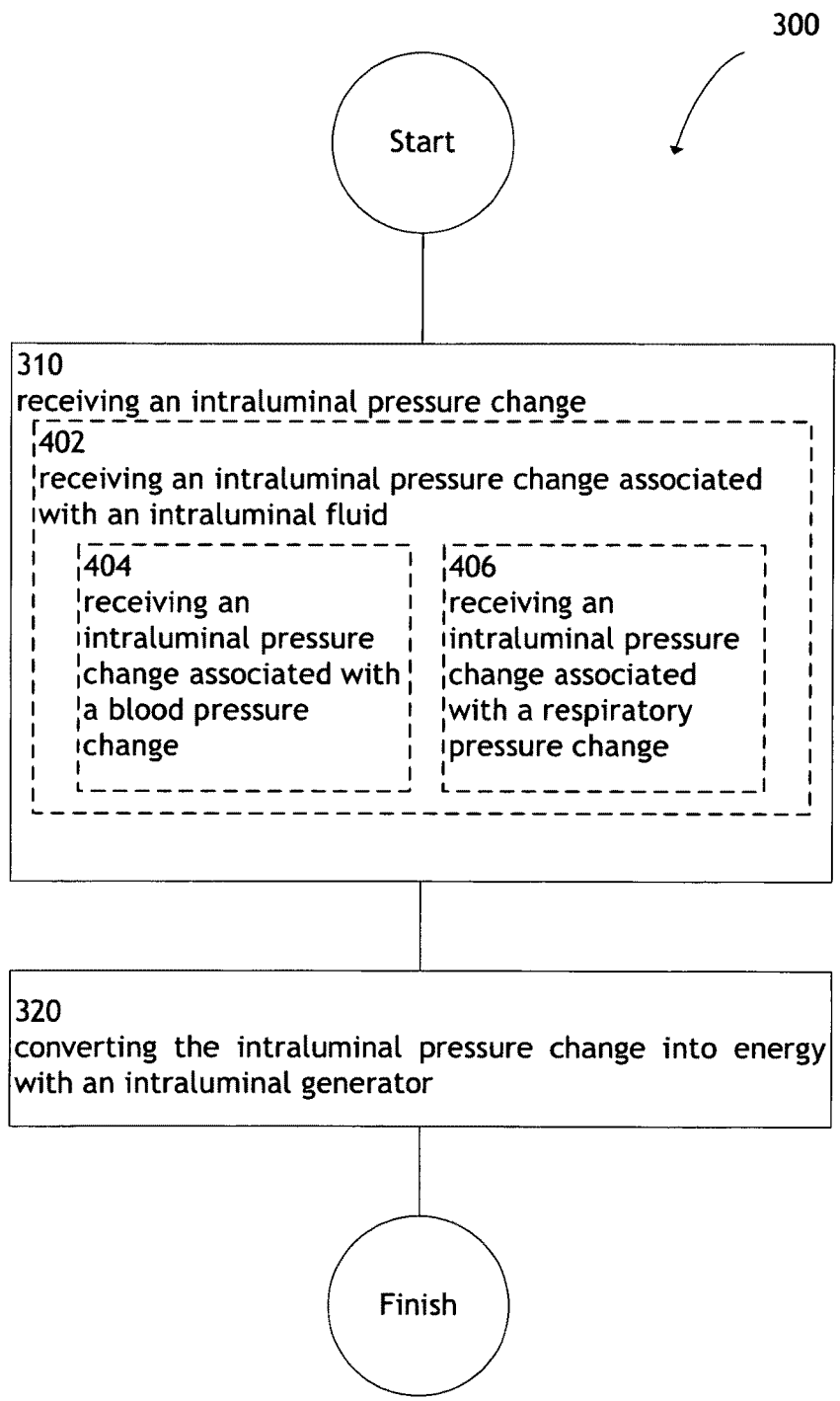
FIG. 4 is a high-level logic flowchart of a process.

FIG. 4 illustrates alternative embodiments of the example operational flow 300 of FIG. 3. FIG. 4 illustrates example embodiments where the receiving operation 310 may include at least one additional operation. Additional operations may include an operation 402, an operation 404 and/or an operation 406.

Operation 402 depicts receiving an intraluminal pressure change associated with an intraluminal fluid. For example, as shown in FIG. 1, a change in pressure associated with a fluid flowing within lumen 101 may be received by the pressure change receiving structure 103 through physical contact of the fluid with a pressure receiving surface of the pressure change receiving structure 103.

Operation 404 depicts receiving an intraluminal pressure change associated with a blood pressure change. For example, as shown in FIG. 1, a change in pressure associated with a transition between a diastolic and systolic state of the heart chambers may induce a change in pressure in blood flowing within lumen 101. The blood may exert a varying pressure on the pressure change receiving structure 103.

Operation 406 depicts receiving an intraluminal pressure change associated with a respiratory pressure change. For example, as shown in FIG. 1, a change in pressure associated with a transition between inhalation and exhalation of the lungs may induce a change in air pressure within a lumen 101. The air may exert a varying pressure on the pressure change receiving structure 103.

Figure 5:
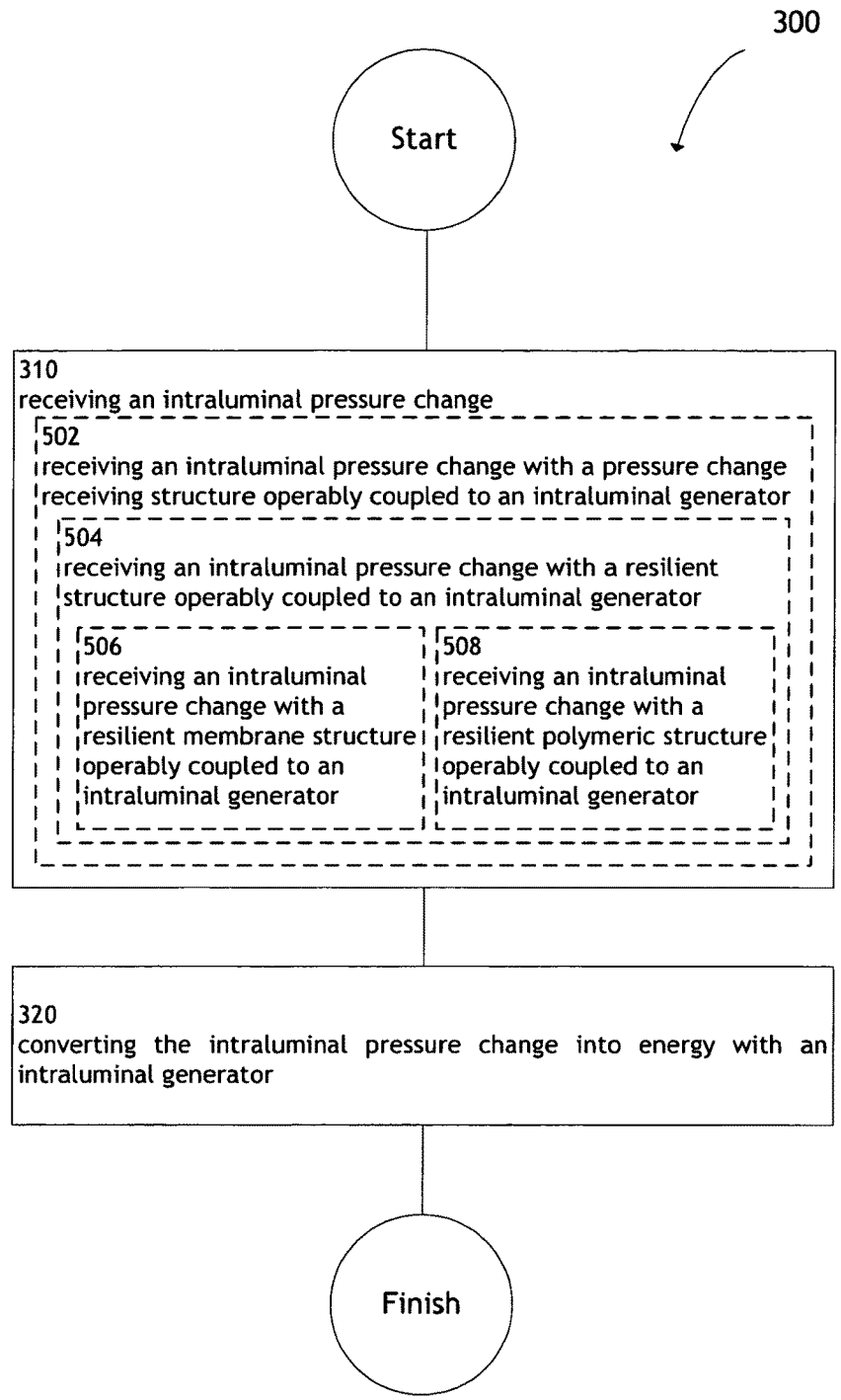
FIG. 5 is a high-level logic flowchart of a process.

FIG. 5 illustrates alternative embodiments of the example operational flow 300 of FIG. 3. FIG. 5 illustrates example embodiments where the receiving operation 310 may include at least one additional operation. Additional operations may include an operation 502, an operation 504, an operation 506 and/or an operation 508.

Operation 502 depicts receiving an intraluminal pressure change with a pressure change receiving structure operably coupled to an intraluminal generator. For example, as shown in FIG. 1, intraluminal generator 100 may be operably coupled to pressure change receiving structure 103B via coupling 104. The pressure change receiving structure 103B may receive a change in pressure associated with a fluid in the lumen 101 and convert and/or transfer that pressure to the intraluminal generator 100 via coupling 104 in a form (e.g. mechanical force, hydraulic force, electromagnetic force) which the intraluminal generator 100 may convert into one or more forms of energy.

Operation 504 depicts receiving an intraluminal pressure change with a resilient structure operably coupled to an intraluminal generator. For example, as shown in FIG. 1, intraluminal generator 100 may be operably coupled to pressure change receiving structure 103B which may be a resilient structure capable of deforming elastically upon application of pressure by an intraluminal fluid and then returning to its original conformation upon a reduction of pressure by the intraluminal fluid.

Operation 506 depicts receiving an intraluminal pressure change with a resilient membrane structure operably coupled to an intraluminal generator. For example, as shown in FIG. 1, intraluminal generator 100 may be operably coupled to a pressure change receiving structure 103B including a resilient membrane structure. The resilient membrane structure may include a membrane disposed over a free-space void thereby partitioning the free-space void from the luminal environment so as to provide a cavity for deformation of the membrane in response to the application of pressure by an intraluminal fluid. The interior of the free-space void defined by the membrane may be evacuated; (e.g. to approximate systolic pressure); pressurized (e.g. to approximate diastolic pressure) or filled with a compressible or non-compressible fluid so as to either assist in moving the membrane between its original conformation and a distended conformation associated with a change in intraluminal pressure or translate the movement of the membrane into a pressurization of the free-space void or a fluid contained therein.

Operation 508 depicts receiving an intraluminal pressure change with a resilient polymeric structure operably coupled to an intraluminal generator. For example, as shown in FIG. 1, intraluminal generator 100 may be operably coupled to a pressure change receiving structure 103B including a resilient polymeric structure. A resilient polymeric structure may include, but is not limited to, polymethacrylate, polyethylene glycol (PEG), polyethylene, polyetheretherketone (PEEK), polytetrafluoroethylene (Teflon), epoxy (e.g. Epo-Tek 353ND) and the like.

Figure 6:
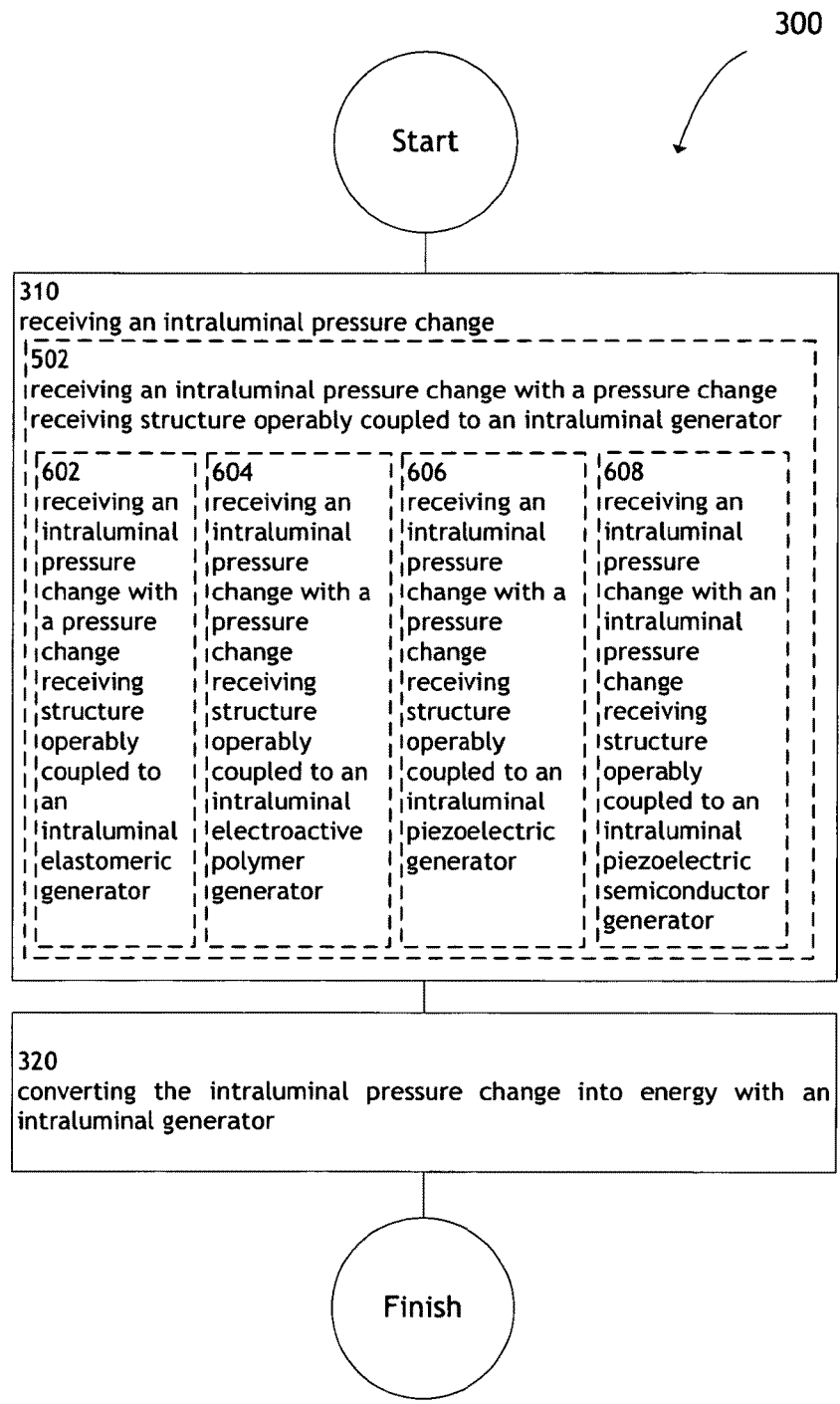
FIG. 6 is a high-level logic flowchart of a process.

FIG. 6 illustrates alternative embodiments of the example operational flow 300 of FIG. 5. FIG. 6 illustrates example embodiments where the receiving operation 502 may include at least one additional operation. Additional operations may include an operation 602, an operation 604, an operation 606 and/or an operation 608.

Operation 602 depicts receiving an intraluminal pressure change with an elastomeric pressure change receiving structure operably coupled to an intraluminal generator. For example, as shown in FIG. 1, intraluminal generator 100 may be operably coupled to a pressure change receiving structure 103B including an elastomeric structure. An elastomeric structure may include, but is not limited to, polymethyl silanes (e.g. those manufactured by NuSil Technologies), polymethyl siloxanes, polyurethane, polyether/polyester copolymers, and the like Operation 604 depicts receiving an intraluminal pressure change with a pressure change receiving structure operably coupled to an intraluminal electroactive polymer generator. For example, as shown in FIG. 1, a pressure change receiving structure 103B may be operably coupled to a intraluminal generator 100 including an electroactive polymer. The electroactive polymer may include at least one of a dielectric electroactive polymers (e.g. electrostrictive polymers, dielectric elastomers) and ionic electroactive polymers (e.g. conductive polymers, ionic polymer-metal composites, responsive gels, Bucky gel actuators).

Operation 606 depicts receiving an intraluminal pressure change with a pressure change receiving structure operably coupled to an intraluminal piezoelectric generator. For example, as shown in FIG. 1, a pressure change receiving structure 103B may be operably coupled to a intraluminal generator 100 including a piezoelectric structure. The piezoelectric structure may include at least one of a naturally occurring crystal (e.g. berlinite, quartz, Rochelle salt, topaz, and tourmaline-group minerals), a manufactured crystal (e.g. gallium orthophosphate, langasite), a manufactured ceramic (e.g. barium titanate, lead titanate, lead zirconate titanate, potassium niobate, lithium niobate, lithium tantalite, sodium tungstate, Sodium potassium niobate, bismuth ferrite), and a polymer (e.g. polyvinylidene fluoride).

Operation 608 depicts receiving an intraluminal pressure change with an intraluminal pressure change receiving structure operably coupled to an intraluminal piezoelectric semiconductor generator. For example, as shown in FIG. 1, a pressure change receiving structure 103B may be operably coupled to a intraluminal generator 100 including a piezoelectric semiconductor (e.g. collagen, zinc oxide, bismuth silicone oxide, gallium arsenide, cadmium sulfide).

Figure 7:
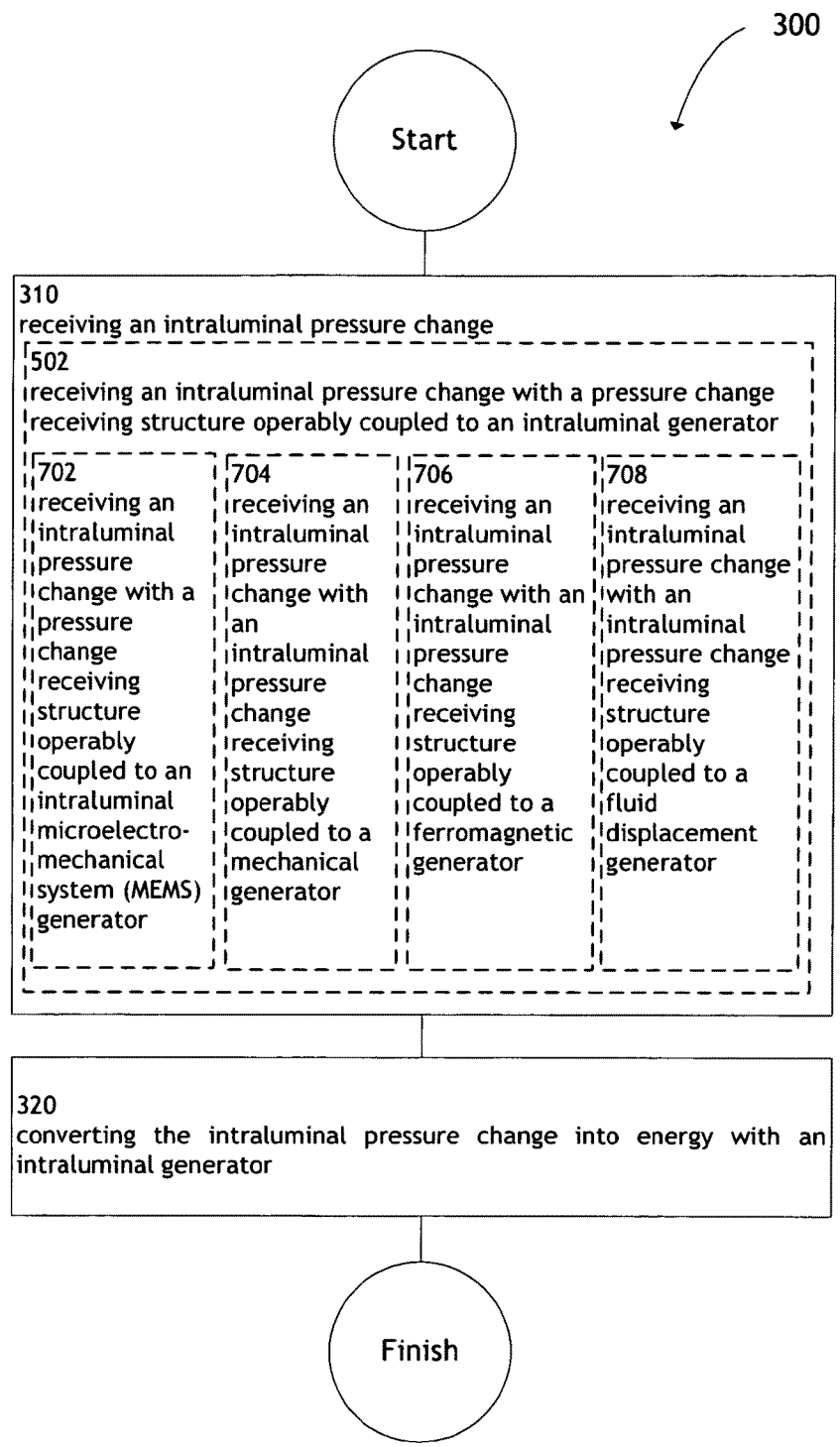
FIG. 7 is a high-level logic flowchart of a process.

FIG. 7 illustrates alternative embodiments of the example operational flow 300 of FIG. 5. FIG. 6 illustrates example embodiments where the receiving operation 502 may include at least one additional operation. Additional operations may include an operation 702, an operation 704, an operation 706 and/or an operation 708.

Operation 702 depicts receiving an intraluminal pressure change with a pressure change receiving structure operably coupled to an intraluminal microelectromechanical system (MEMS) generator. For example, as shown in FIG. 1, a pressure change receiving structure 103B may be operably coupled to a intraluminal generator 100 including a MEMS generator. The MEMS generator may include those described in "Multi-Watt Electric Power from a Microfabricated Permanent-Magnet Generator" by Das, et al. (see http://mtlweb.mit.edu/research/annual_reports/2005/ms/ms_42.pdf); "MEMS Generator of Power Harvesting by Vibrations using Piezoelectric Cantilever Beam with Digitate Electrode" by Lee, et al., (see http://adsabs.harvard.edu/abs/2006SPIE.6169 . . . 63L); and/or "Novel MEMS Power Generator with Integrated Thermoelectric and Vibrational Devices" by Sato et al., The 13th Intemarional Conference on Solid-state Sensors, Actuators and Microsystems, Seoul, Korea, June 59, 2005 (see http://ieeexplore.ieee.org/application/enterprise/entconfirmation.jsp?arnumber=1496415), and the like.

Operation 704 depicts receiving an intraluminal pressure change with an intraluminal pressure change receiving structure operably coupled to a mechanical generator. For example, as shown in FIG. 1, a pressure change receiving structure 103B may be operably coupled to a mechanical intraluminal generator 100 capable of converting motion of the pressure change receiving structure 103B into mechanical energy. The intraluminal generator 100 may include a piston, lever, spring, or rachet mechanism operably coupled to the pressure change receiving structure 103B.

Operation 706 depicts receiving an intraluminal pressure change with an intraluminal pressure change receiving structure operably coupled to a ferromagnetic generator. For example, as shown in FIG. 1, a pressure change receiving structure 103B may be operably coupled to a ferromagnetic intraluminal generator 100. The ferromagnetic intraluminal generator 100 may include a ferromagnetic (e.g. magnetized iron, nickel cobalt) portion which may be disposed proximate to an electrical circuit whereby motion of the pressure change receiving structure 103B may affect an associated movement of the ferromagnetic portion, thereby inducing a current in the circuit via magnetic induction.

Operation 708 depicts receiving an intraluminal pressure change with an intraluminal pressure change receiving structure operably coupled to a fluid displacement generator. For example, as shown in FIG. 1, a pressure change receiving structure 103B may be operably coupled to a fluid displacement intraluminal generator 100. The fluid displacement intraluminal generator 100 may be a pump (e.g. a positive displacement pump) including one or more pump rotors. The motion of the pressure change receiving structure 103A may rotate the one or more rotors within the intraluminal generator 100 thereby increasing a pressure of a fluid contained within an associated system (e.g. a hydraulic line).

Figure 8:
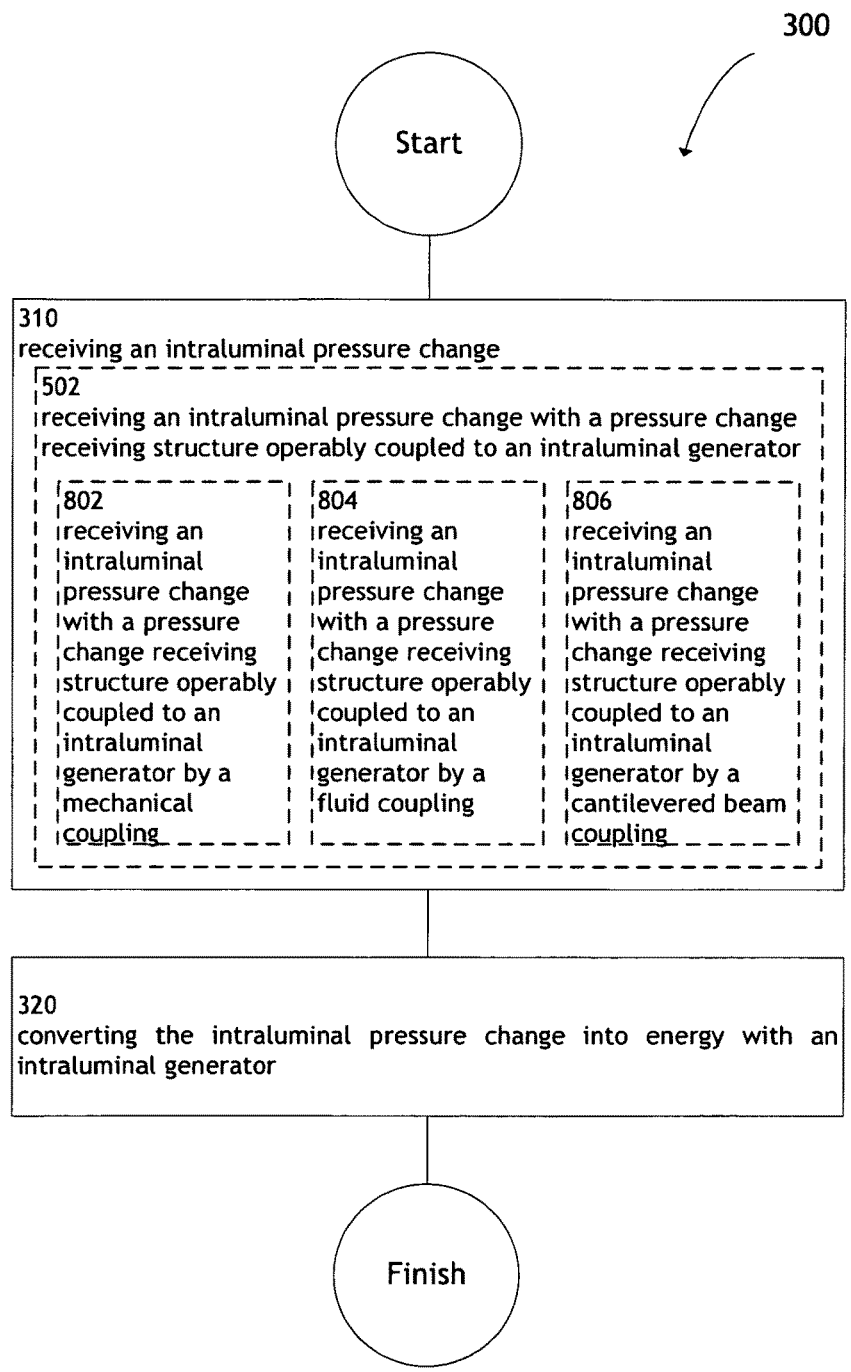
FIG. 8 is a high-level logic flowchart of a process.

FIG. 8 illustrates alternative embodiments of the example operational flow 300 of FIG. 5. FIG. 8 illustrates example embodiments where the receiving operation 520 may include at least one additional operation. Additional operations may include an operation 802 an operation 804, and/or an operation 806.

Operation 802 depicts receiving an intraluminal pressure change with a pressure change receiving structure operably coupled to an intraluminal generator by a mechanical coupling. For example, as shown in FIG. 1, pressure change receiving structure 103B may be operably coupled to intraluminal generator 100 by a mechanical coupling 104 (e.g. a connecting shaft or wire, piston).

Operation 804 depicts receiving an intraluminal pressure change with a pressure change receiving structure operably coupled to an intraluminal generator by a fluid coupling. For example, as shown in FIG. 1, pressure change receiving structure 103B may be operably coupled to intraluminal generator 100 by a fluid coupling 104 (e.g. fluid filled conduit, hydraulic line).

Operation 806 depicts receiving an intraluminal pressure change with a pressure change receiving structure operably coupled to an intraluminal generator by a cantilevered beam coupling. For example, as shown in FIG. 1, pressure change receiving structure 103B may be operably coupled to intraluminal generator 100 by a cantilevered beam coupling 104. The pressure change receiving structure 103B may be disposed at an unsupported portion of the cantilevered beam coupling 104 and the intraluminal generator 100 connected at the supported portion of the beam. A movement of the pressure change receiving structure 103B may impart a moment force at the connection point of the cantilevered beam coupling 104 with the intraluminal generator 100.

Figure 9:
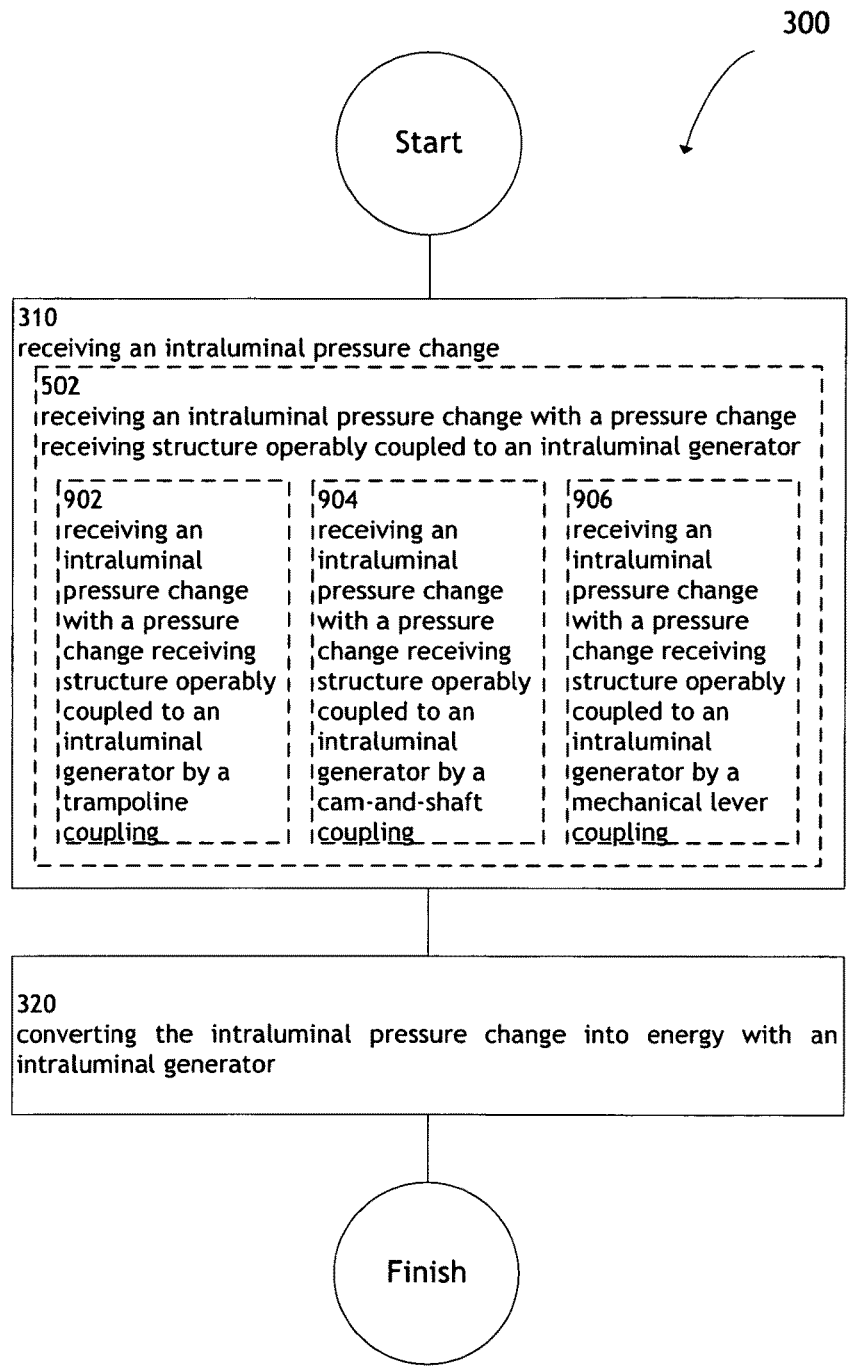
FIG. 9 is a high-level logic flowchart of a process.

FIG. 9 illustrates alternative embodiments of the example operational flow 300 of FIG. 5. FIG. 9 illustrates example embodiments where the receiving operation 520 may include at least one additional operation. Additional operations may include an operation 902 an operation 904, and/or an operation 906.

Operation 902 depicts receiving an intraluminal pressure change with a pressure change receiving structure operably coupled to an intraluminal generator by a trampoline coupling. For example, as shown in FIG. 1, pressure change receiving structure 103B may be operably coupled to intraluminal generator 100 by a trampoline coupling 104. A trampoline coupling may include a membrane which may receive an intraluminal pressure change. An areal force applied to the membrane may result in a tension force at the rim of the membrane which may act on the generator.

Operation 904 depicts receiving an intraluminal pressure change with a pressure change receiving structure operably coupled to an intraluminal generator by a camshaft coupling. For example, as shown in FIG. 1, pressure change receiving structure 103B may be operably coupled to intraluminal generator 100 by a camshaft coupling 104. The pressure change receiving structure 103B may be coupled to a first end of a camshaft coupling 104. A movement of the pressure change receiving structure 103B may cause the camshaft coupling 104 to rotate. The movements of the cams of the camshaft coupling 104 may, in turn, move various portions of the intraluminal generator 100 (e.g. ferromagnetic portions) so as to generate energy.

Operation 906 depicts receiving an intraluminal pressure change with a pressure change receiving structure operably coupled to an intraluminal generator by a mechanical lever coupling. For example, as shown in FIG. 1, pressure change receiving structure 103B may be operably coupled to intraluminal generator 100 by a mechanical lever coupling 104. The pressure change receiving structure 103B may be coupled to a first end of a mechanical lever coupling 104 and the intraluminal generator 100 may be coupled to a second end of the mechanical lever coupling 104. A movement of the pressure change receiving structure 103B may cause the first end of the mechanical lever coupling 104 to impart a corresponding movement in second end of the mechanical lever coupling 104. The movement of the second end of the mechanical lever.

Figure 10:
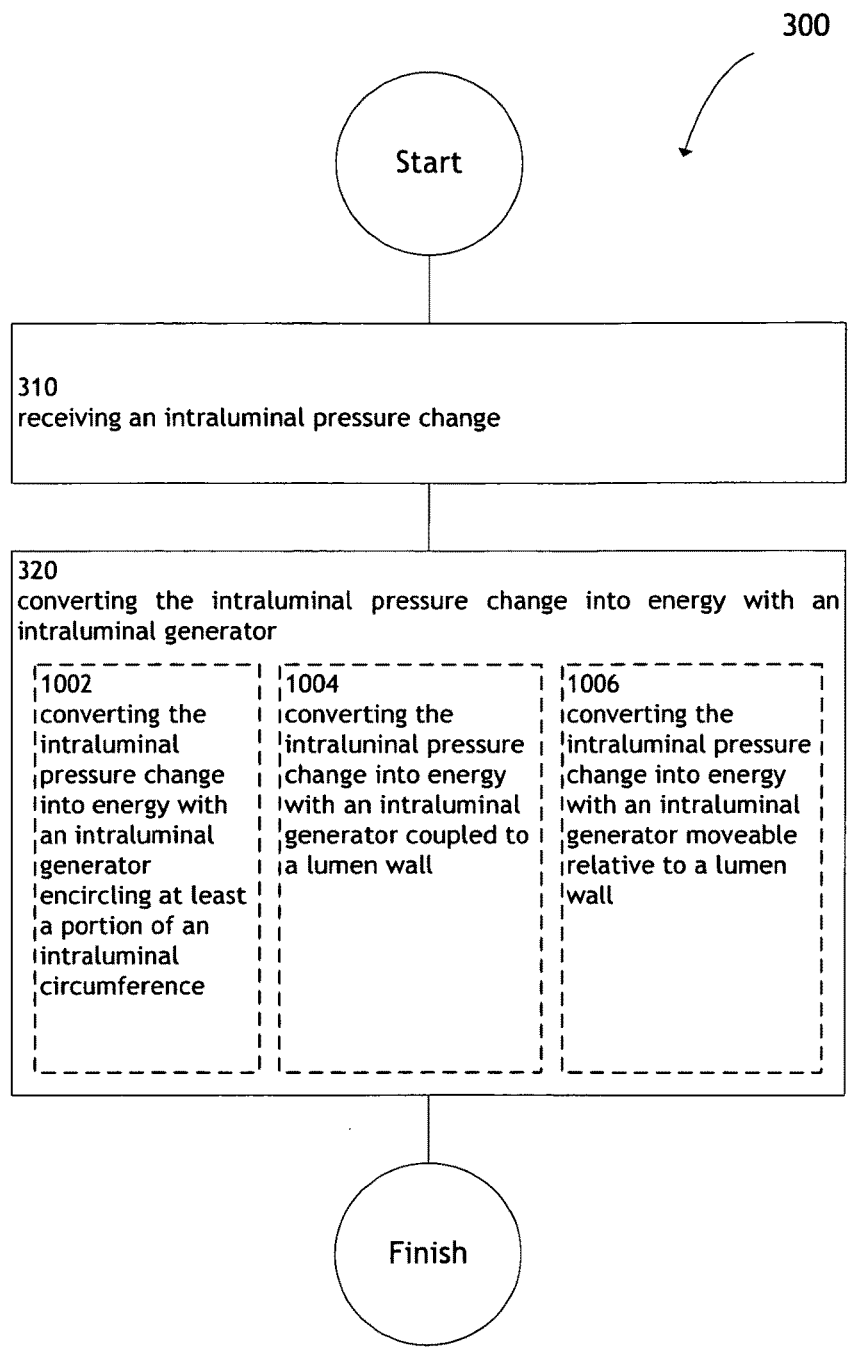
FIG. 10 is a high-level logic flowchart of a process.

FIG. 10 illustrates alternative embodiments of the example operational flow 300 of FIG. 3. FIG. 10 illustrates example embodiments where the converting operation 320 may include at least one additional operation. Additional operations may include an operation 1002, an operation 1004 and/or an operation 1006.

Operation 1002 depicts converting the intraluminal pressure change into energy with an intraluminal generator encircling at least a portion of an intraluminal circumference. For example, as shown in FIG. 1, the intraluminal generator 100 may be configured in at least a partially ring-shaped manner such that it may be secured within the lumen 101 by contacting at least a portion of the lumen wall 102 while still permitting fluid flow through the lumen 101.

Operation 1004 depicts converting the intraluminal pressure change into energy with an intraluminal generator coupled to a lumen wall. For example, as shown in FIG. 1, the intraluminal generator 100 may be coupled to the lumen wall 102 via mechanical attachments such as hooks, barbs, anchors, via bioadhesives, via friction from a radially applied force, or similar methods.

Operation 1006 depicts converting the intraluminal pressure change into energy with an intraluminal generator moveable relative to a lumen wall. For example, as shown in FIG. 1, the intraluminal generator 100 may be tethered to the lumen wall 102 so as to restrict axial movement along the length of the lumen 101 while permitting radial movement across the width of the lumen 101.

Figure 11:
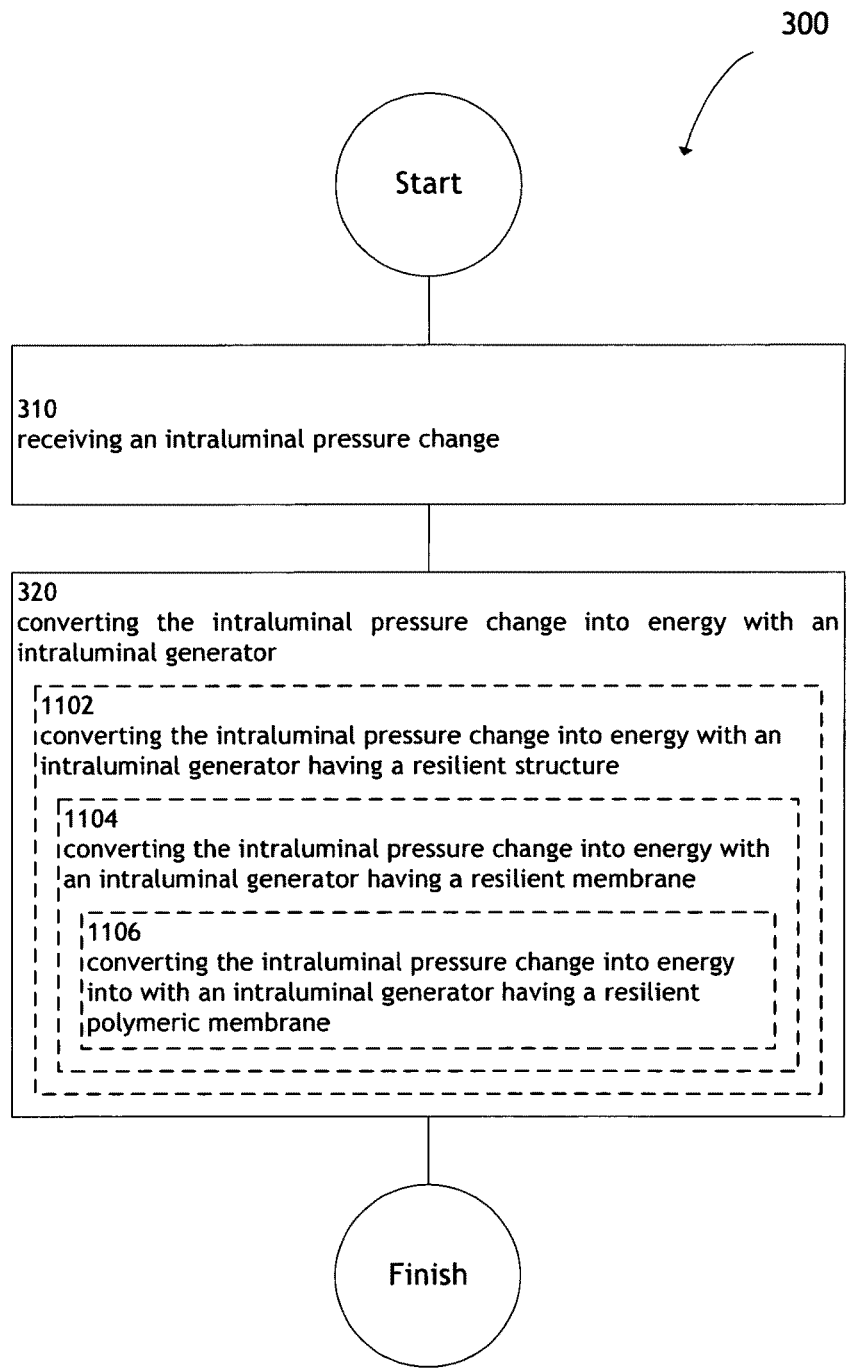
FIG. 11 is a high-level logic flowchart of a process.

FIG. 11 illustrates alternative embodiments of the example operational flow 300 of FIG. 3. FIG. 11 illustrates example embodiments where the converting operation 320 may include at least one additional operation. Additional operations may include an operation 1102, an operation 1104, and/or an operation 1106.

Operation 1102 depicts converting the intraluminal pressure change into energy with an intraluminal generator having a resilient structure. For example, as shown in FIG. 1, intraluminal generator 100 may comprise a pressure change receiving structure 103A including a resilient structure capable of deforming elastically upon application of pressure by an intraluminal fluid and then returning to its original conformation upon a reduction of pressure by the intraluminal fluid.

Operation 1104 depicts converting the intraluminal pressure change into energy with an intraluminal generator having a resilient membrane. For example, as shown in FIG. 1, intraluminal generator 100 may comprise a pressure change receiving structure 103A including a resilient membrane structure. The resilient membrane structure may include a membrane disposed over a free-space void thereby partitioning the free-space void from the luminal environment so as to provide a cavity for deformation of the membrane in response to the application of pressure by an intraluminal fluid. The interior of the free-space void defined by the membrane may be evacuated; (e.g. to approximate systolic pressure); pressurized (e.g. to approximate diastolic pressure) or filled with a compressible or non-compressible fluid so as to either assist in moving the membrane between its original conformation and a distended conformation associated with a change in intraluminal pressure or translate the movement of the membrane into a pressurization of the free-space void or a fluid contained therein.

Operation 1106 depicts converting the intraluminal pressure change into energy with an intraluminal generator having a resilient polymeric membrane. For example, as shown in FIG. 1, intraluminal generator 100 may comprise a pressure change receiving structure 103A including a resilient polymeric membrane structure. A resilient polymeric membrane structure may include, but is not limited to, polymethacrylate membranes, polyethylene glycol (PEG) membranes, polyethylene membranes, polyetheretherketone (PEEK) membranes, polytetrafluoroethylene (Teflon) membranes, epoxy (e.g. Epo-Tek 353ND) membranes, and the like.

Figure 12:
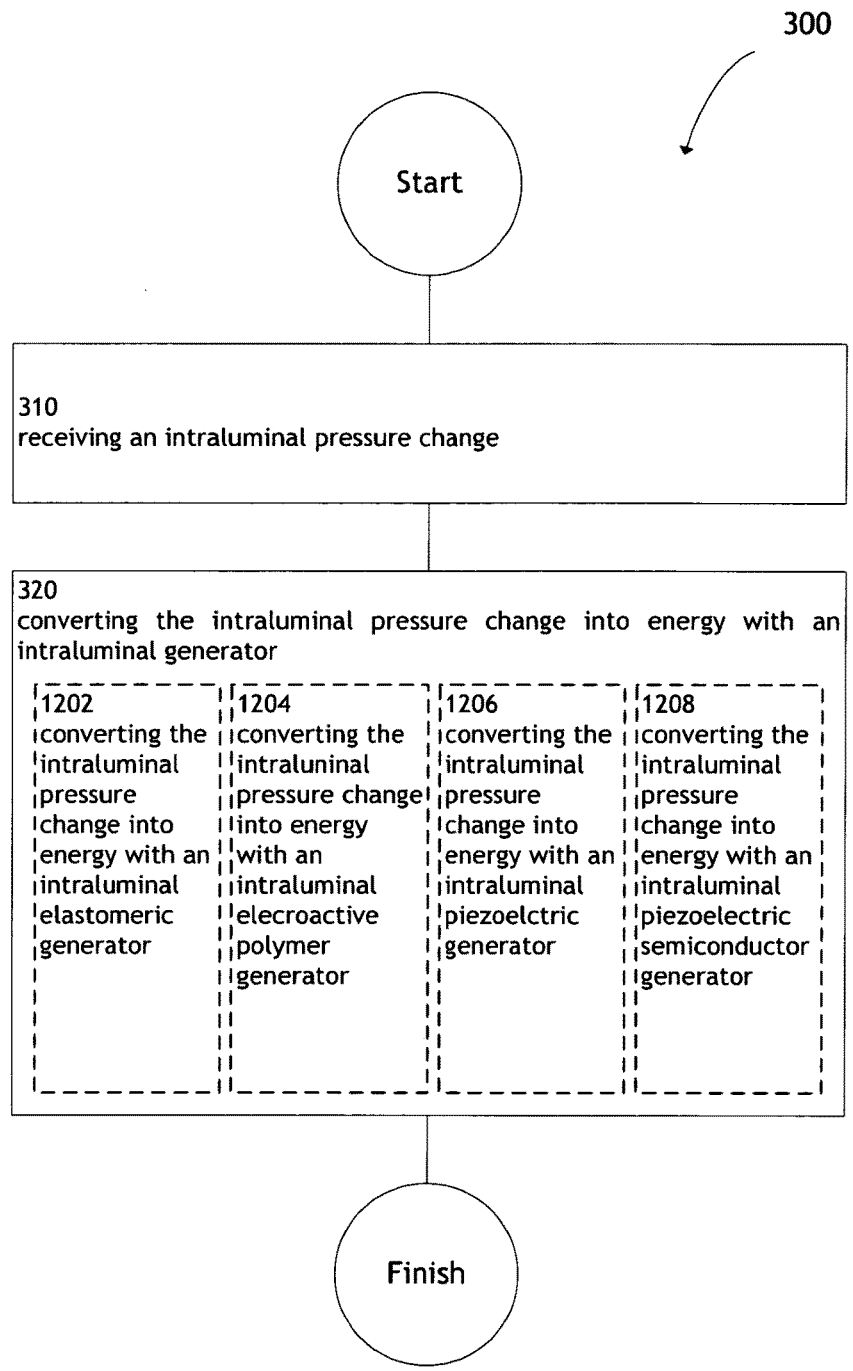
FIG. 12 is a high-level logic flowchart of a process.

FIG. 12 illustrates alternative embodiments of the example operational flow 300 of FIG. 3. FIG. 12 illustrates example embodiments where the converting operation 320 may include at least one additional operation. Additional operations may include an operation 1202, an operation 1204, an operation 1206, and/or an operation 1208.

Operation 1202 depicts converting the intraluminal pressure change into energy with an intraluminal elastomeric generator. For example, as shown in FIG. 1, intraluminal generator 100 may comprise a pressure change receiving structure 103A including an elastomeric structure. An elastomeric structure may include, but is not limited to, polymethyl silanes (e.g. those manufactured by NuSil Technologies), polymethyl siloxanes, polyurethane, polyether/polyester copolymers, and the like.

Operation 1204 depicts converting the intraluminal pressure change into energy with an intraluminal electroactive polymer generator. For example, as shown in FIG. 1, intraluminal generator 100 may comprise a pressure change receiving structure 103A including an electroactive polymer. The electroactive polymer may include at least one of a dielectric electroactive polymers (e.g. electrostrictive polymers, dielectric elastomers) and ionic electroactive polymers (e.g. conductive polymers, ionic polymer-metal composites, responsive gels, and Bucky gel actuators).

Operation 1206 depicts converting the intraluminal pressure change into energy with an intraluminal piezoelectric generator. For example, as shown in FIG. 1, intraluminal generator 100 may comprise a pressure change receiving structure 103A including a piezoelectric structure. The piezoelectric structure may include at least one of a naturally occurring crystal (e.g. berlinite, quartz, Rochelle salt, topaz, and tourmaline-group minerals), a manufactured crystal (e.g. gallium orthophosphate, langasite), a manufactured ceramic (e.g. barium titanate, lead titanate, lead zirconate titanate, potassium niobate, lithium niobate, lithium tantalite, sodium tungstate, Sodium potassium niobate, bismuth ferrite), and a polymer (e.g. polyvinylidene fluoride).

Operation 1208 depicts converting the intraluminal pressure change into energy with an intraluminal piezoelectric semiconductor generator. For example, as shown in FIG. 1, intraluminal generator 100 may include a pressure change receiving structure 103A including a piezoelectric semiconductor (e.g. collagen, zinc oxide, bismuth silicone oxide, gallium arsenide, cadmium sulfide).

Figure 13:
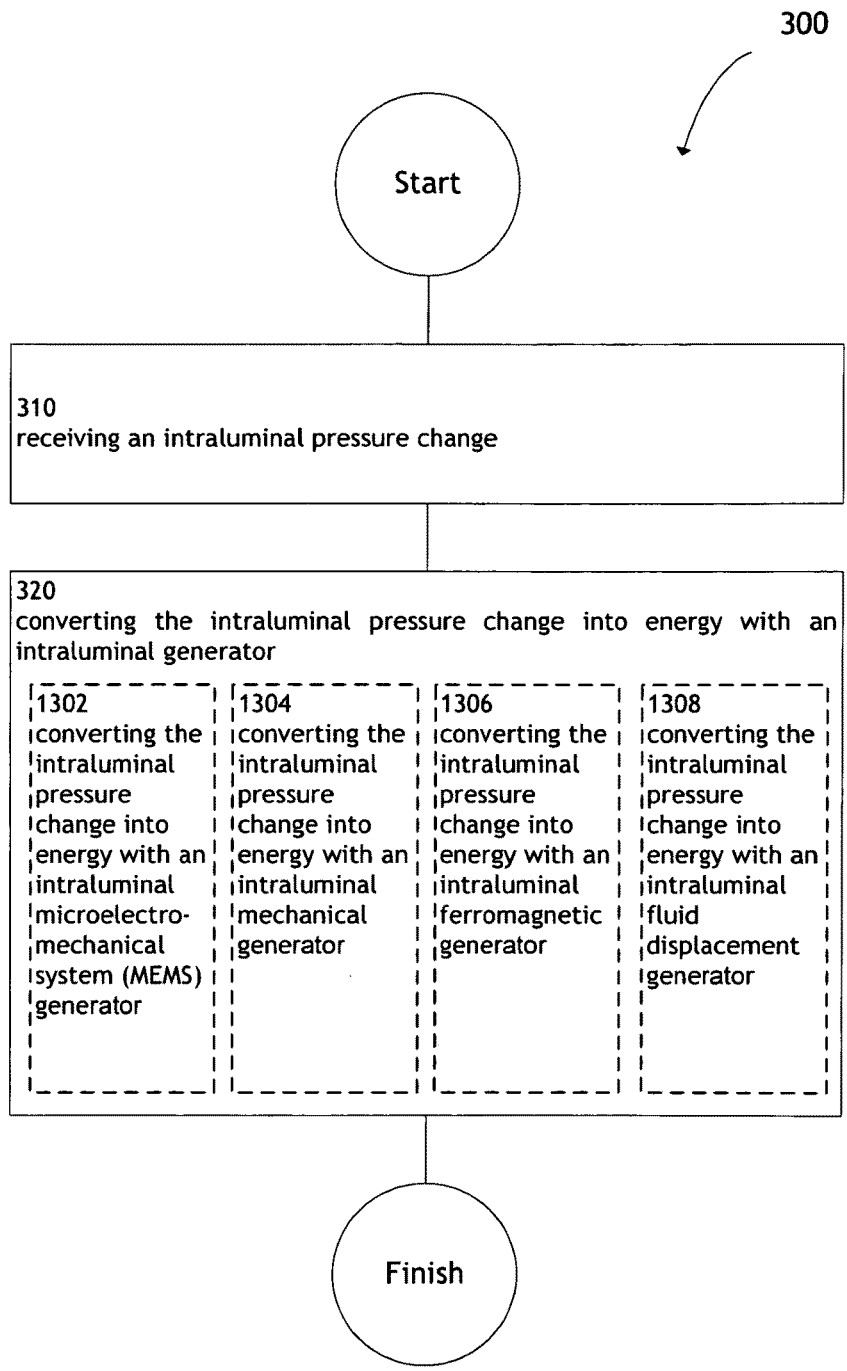
FIG. 13 is a high-level logic flowchart of a process.

FIG. 13 illustrates alternative embodiments of the example operational flow 300 of FIG. 3. FIG. 12 illustrates example embodiments where the converting operation 320 may include at least one additional operation. Additional operations may include an operation 1302, an operation 1304, an operation 1306, and/or an operation 1308.

Operation 1302 depicts converting the intraluminal pressure change into energy with an intraluminal microelectromechanical system (MEMS) generator. For example, as shown in FIG. 1, intraluminal generator 100 may be a MEMS generator. The MEMS generator may include those described in "Multi-Watt Electric Power from a Microfabricated Permanent-Magnet Generator" by Das, et al. (see http://mtlweb.mit.edu/research/annual_reports/2005/ms/ms_42.pdf); "MEMS Generator of Power Harvesting by Vibrations using Piezoelectric Cantilever Beam with Digitate Electrode" by Lee, et al., (see http://adsabs.harvard.edu/abs/2006SPIE.6169...63L); and/or "Novel MEMS Power Generator with Integrated Thermoelectric and Vibrational Devices" by Sato, et al., The 13th Internarional Conference on Solid-state Sensors, Actuators and Microsystems, Seoul, Korea, June 59, 2005 (see http://ieeexplore.ieee.org/application/enterprise/entconfirmation.jsp?arnumber=1496415), and the like.

Operation 1304 depicts converting the intraluminal pressure change into energy with a mechanical generator. For example, as shown in FIG. 1, intraluminal generator 100 may be a mechanical generator capable of converting motion of the pressure change receiving structure 103A into mechanical energy. The intraluminal generator 100 may include a piston, lever, spring, or rachet mechanism operably coupled to the pressure change receiving structure 103A.

Operation 1306 depicts converting the intraluminal pressure change into energy with a ferromagnetic generator. For example, as shown in FIG. 1, intraluminal generator 100 may be a ferromagnetic generator. The pressure change receiving structure 103A may include a ferromagnetic (e.g. magnetized iron, nickel cobalt) portion which may be disposed proximate to an electrical circuit whereby motion of the pressure change receiving structure 103A may induce a current in the circuit via magnetic induction.

Operation 1308 depicts converting the intraluminal pressure change into energy with a fluid displacement generator. For example, as shown in FIG. 1, intraluminal generator 100 may be a pump (e.g. a positive displacement pump). The motion of the pressure change receiving structure 103A may rotate one or more rotors within the intraluminal generator 100 thereby increasing a pressure of a fluid contained within an associated system (e.g. a hydraulic line).

The herein described subject matter may illustrate different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A method comprising:
receiving an intraluminal pressure change with a deformable pressure change receiving structure that is operably coupled to an intraluminal piezoelectric generator, said intraluminal pressure change associated with an intraluminal fluid, said deformable pressure change receiving structure in physical contact with said intraluminal fluid; and
converting the intraluminal pressure change into electric current energy with the intraluminal piezoelectric generator;
wherein the receiving an intraluminal pressure change with the deformable pressure change receiving structure that is operably coupled to the intraluminal piezoelectric generator comprises:
   receiving an intraluminal pressure change with a resilient structure operably coupled to the intraluminal piezoelectric generator;
   wherein the receiving an intraluminal pressure change with a resilient structure comprises:
      receiving an intraluminal pressure change with a resilient polymeric structure operably coupled to the intraluminal piezoelectric generator.

2. A method comprising:
receiving an intraluminal pressure change with a deformable pressure change receiving structure that is operably coupled to an intraluminal piezoelectric generator, said intraluminal pressure change associated with an intraluminal fluid, said deformable pressure change receiving structure in physical contact with said intraluminal fluid; and
converting the intraluminal pressure change into electric current energy with the intraluminal piezoelectric generator;
wherein the receiving an intraluminal pressure change with the deformable pressure change receiving structure that is operably coupled to the intraluminal piezoelectric generator comprises:
   receiving an intraluminal pressure change with an elastomeric pressure change receiving structure operably coupled to the intraluminal piezoelectric generator.

3. A method comprising:
receiving an intraluminal pressure change with a deformable pressure change receiving structure, said intraluminal pressure change associated with an intraluminal fluid, said deformable pressure change receiving structure in physical contact with said intraluminal fluid; and
converting the intraluminal pressure change into electric current energy with an intraluminal piezoelectric generator;
wherein the converting the intraluminal pressure change into electric current energy with an intraluminal piezoelectric generator comprises:
   converting the intraluminal pressure change into electric current energy with the intraluminal piezoelectric generator that includes the deformable pressure change receiving structure having a resilient structure;
   wherein the converting the intraluminal pressure change into electric current energy with an intraluminal piezoelectric generator that includes the deformable pressure change receiving structure having a resilient structure comprises:
      converting the intraluminal pressure change into electric current energy with an intraluminal piezoelectric generator that includes the deformable pressure change receiving structure having a resilient membrane:
      wherein the converting the intraluminal pressure change into electric current energy with an intraluminal piezoelectric generator that includes the deformable pressure change receiving structure having a resilient membrane comprises:
         converting the intraluminal pressure change into electric current energy with an intraluminal piezoelectric generator that includes the deformable pressure change receiving structure having a resilient polymeric membrane.

* * * * *